May 27, 1969     A. M. UHLMANN     3,446,125

PHOTOGRAPHIC APPARATUS FOR OBTAINING ARTISTIC EFFECTS

Filed Jan. 24, 1967

Arthur M. Uhlmann
INVENTOR

BY Arnold, Roylance, Kruger & Durkee
ATTORNEYS

United States Patent Office 3,446,125
Patented May 27, 1969

3,446,125
PHOTOGRAPHIC APPARATUS FOR OBTAINING
ARTISTIC EFFECTS
Arthur M. Uhlmann, Houston, Tex., assignor to Helen
Uhlmann, John Uhlmann, James Uhlmann, and Arthur
Uhlmann, all of Houston, Tex.
Filed Jan. 24, 1967, Ser. No. 611,388
Int. Cl. G03b 33/00, 41/00
U.S. Cl. 95—1                                10 Claims

ABSTRACT OF THE DISCLOSURE

A camera having a lens mounted in an extended lens holder and a tubular shroud fitted in the end of the lens holder. A prism mounted in the shroud in a manner such that at least a semicircular section of the lens is not covered by any portion of the prism. The shroud with the prism is rotatable about the longitudinal axis of the lens holder upon rotation of the prism unusual effects are produced upon the pictures made with the camera.

---

This invention relates to a method of photography, and to apparatus for use in accomplishing the method. More specifically, the present invention relates to a method and apparatus for use in connection with certain prior art cameras for obtaining selected novel artistic effects heretofore unobtainable.

The advance of the photographic arts within the last several years has been spectacular. The demand for skillful photographic techniques is now greater than ever, and there is a pronounced need for techniques which will provide artful and unusual photographic effects. The demand is especially great for those techniques which do not require any special procedures after the exposure has been made. In other words, procedures such as special processing of the film or alteration of the film after it is developed are to be avoided not only because they are usually unsatisfactory from an esthetic standpoint but also because they are time consuming, expensive, and often unpredictable of result.

By use of the present invention, many novel effects may be obtained which may be obtained, if at all, only at very great expense with any prior art method or apparatus. For example, one embodiment of this invention provides an artistic phenomenon identical to that available with the so-called "mirror reflex" lenses. These lenses (500 mm. to 1000 mm.), which fit 35 mm. cameras, are manufactured at present only by Japanese and Russian firms and sold at extremely high prices in the United States. When cameras with such lenses are used in sunlight, the light may strike the lens in such a manner that little circles of white light are formed on the film and appear on the resulting photograph. A similar effect, although an effect in many respects superior to that obtained by using the mirror reflex camera, can be obtained with the method and apparatus of the present invention.

Unique light dispersions which provide on a photograph variegated color effects may also be provided by use of this invention. The type of effect realized may be similar to a rainbow in one or more sections of the photograph, or it may take the form of random multi-colored patches. The color dispersion may further be shifted to any desired part of the photograph. In any case, the effect achieved is highly pleasing, and some of the most simple of photographs can be readily transformed into artistic masterpieces.

Use of the present invention also allows for combination of the variegated color effect and the mirror reflex effect in the same photograph. In this manner, especially beautiful photographs may be made.

The invention may be further used to obtain "trick" shots such as the transposition of one scene onto another. That is, a photograph may be made of one scene, with an adjacent or distant (within range of sight) scene transposed onto it in any desired manner.

Further, a trick shot such as the above can be combined with a color dispersion.

A key feature of the invention is that each of the above mentioned advantages may not only be provided, but may also be controlled. That is, the user of the invention may not only obtain these advantages, but he may also select which effect he desires and adjust the mechanism of the invention until that effect is achieved. And the effect appears to the user before the picture is taken, giving him an accurate representation of the final product before exposure of the film. This control, it will be recognized, is extremely important and valuable and indeed provides the basis for the practicality of the present invention.

It will be further seen that the above advantages are accomplished by use of a relatively simple and easy to use apparatus.

The unusual and artistic effects achieved with this invention in this simple and easy to use manner are extremely valuable, for example, to commercial photographers, amateur photographers, advertisers, and publishers.

In order that the invention may be understood in greater detail, reference is made to the accompanying drawing which forms a part of this specification and wherein.

Figure 1:
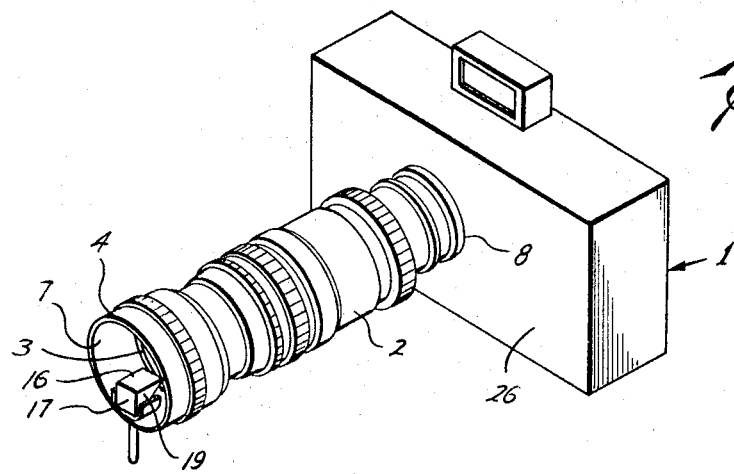
FIGURE 1 is a pictorial view of one embodiment of the invention, in conjunction with a camera having an extended lens.

Referring now more particularly to the drawings, there is pictorially illustrated a camera 1 which might be for example a standard 35 mm. camera. The camera 1 has an opening 8 in the front face 26 thereof into which may be positioned a generally cylindrical elongated lens holder 2 which contains therein a lens 3, the center 25 of which is on the longitudinal axis 15 of the cylindrical lens holder 2. Any suitable size lens, such as 28 mm., 50 mm., 105 mm., 200 mm., 300 mm., or 400 mm., might be used.

The extension 2 is fitted at one end, as by means of a threaded section, into the opening 8 of camera body 1. At the end opposite the camera body, the extension 2 terminates at a small annular threaded section 5.

A generally tubular shroud 4 is constructed with means for affixing it to the end of extension 2, e.g. with threads 6 at one end thereof suitable for mating with the threaded section 5 of extension 2. The shroud 4 may or may not be of the same diameter as the extension 2, but the longitudinal axis thereof is concentric with the longitudinal axis 15 of the extension. The end of shroud 4 opposite the threads 6 terminates in an opening 7 which is conveniently approximately as large in diameter as the lens 3.

Figure 2:
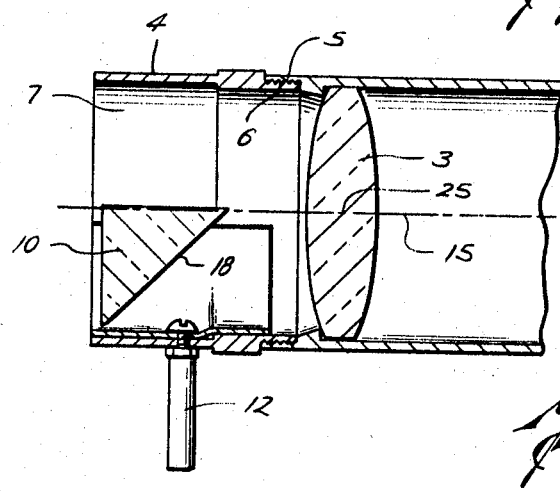
FIGURE 2 is a fragmentary side view, of the apparatus illustrated in FIGURE 1.
Figure 3:
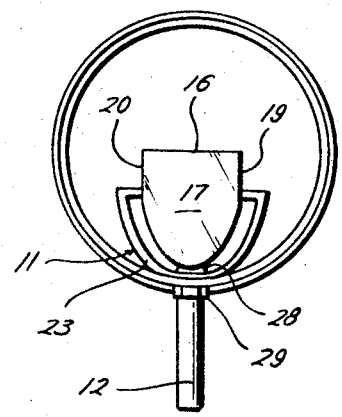
FIGURE 3 is an end view of the apparatus of FIGURE 1, with the apparatus in a first position; and, FIGURE 4 is a view similar to FIGURE 3, with the apparatus in a second position.
Figure 4:
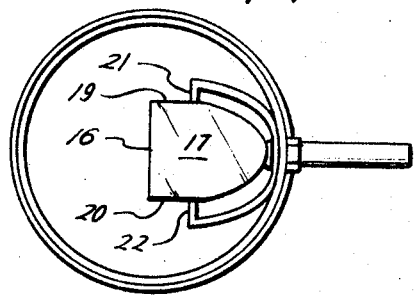

Positioned in the shroud 4 in the manner illustrated in FIGURES 2–4 is a prism 10. The prism 10 illustrated in this embodiment of the invention is seen to be comprised of planar legs 16 and 17 which intersect at right angles, and a planar hypotenuse 18 which intersects each of the legs 16 and 17 at an angle of 45°. Side faces 19 and 20 of the prism are perpendicularly disposed to each of the planar faces 16, 17, and 18.

Prism 10 is oriented in the shroud 4 with the leg 16 parallel to axis 15, and generally perpendicular to the lens 3. Leg 17 is oriented perpendicular to the axis 15 and generally parallel to the lens 3.

Further, it is seen that the orientation of the prism in the shroud and with respect to the lens is such that the axis 15 is at least approximately in the plane of leg 16 no matter what position the prism 10 is in. Means is included for rotating the shroud 4 throughout 360° with respect to the lens 3; such means conveniently comprise an arm 12 attached to the shroud for this purpose. It will be noted that, at any position in the circle of revolution, each point on the prism 10 is the same distance from the axis 15 as it is at every other position. Thus, while rotation of the prism (by rotation of the shroud) changes the relative location of the prism with respect to every point on the lens other than the center 25 (and other points along the axis 15), the relative position of each point with the center remains constant. It is readily seen (for instance, compare the positions of the prism 10 in FIGURES 3 and 4) that the face 16 remains, throughout rotation of the shroud, parallel to the axis 15 and the face 17 remains perpendicular to the axis 15. Likewise, the angular relationship of the hypotenuse 18 with the axis 15 remains constant during rotation of the shroud 4.

The prism 10 may be retained in the shroud in any convenient manner, and by any suitable means.

For example, as viewed in FIGURES 2–4, a holder 11 having a curved portion 23 and fingers 21 and 22 may be provided. In this embodiment, the curvature of portion 23 is greater than the width of the prism 10. The fingers 21 and 22 (which are desirably resilient) are disposed at opposite ends of portion 23 and project inwardly and hold it in place.

Holder 11 may be retained in the shroud, for example, by means of a screw 28 fitting through a hole in the bottom of curved portion 23. The extended end of screw 28 may form the arm 11, and a washer 29 is conveniently affixed to the screw to retain it in place. In this manner, the holder 11 is firmly retained in the shroud, and yet may be removed by the user when desired.

Light enters the lens 3 to be focused on the film in the camera body 1, through the opening 7 in the end of the shroud. With the extension 2 directed toward an object, light from that object enters normal to the lens, parallel to the axis 15. Light from other sources may enter through the opening 7, however, at some obtuse angle with the lens and the longitudinal axis 15. Some of such light may strike the face 16 of the prism 10, whereupon it travels through the prism to be emitted at hypotenuse 18. The exiting light is refracted so that it is directed normal to the lens 3, parallel to the axis 15. This latter path of travel is thus parallel to path of travel of the light entering directly from the object on which the camera is focused.

It is this light entering from the face 16 which provides the varied effects available with this invention. If the camera 1 is tilted upwardly, downwardly, or sideways, more or less light may enter the camera through the opening 7, and thus more or less color dispersion or other effects may be realized. But it is noted that a normal, undistorted image of the object on which the camera is focused is always received, and this image may be received with or without added artistic effects. This is because substantially one complete semicircle of the lens surface is left clear of the prism, and the prism is oriented such that light may enter from the object through the prism directly to the lens without reflection or refraction. It is further of great importance that, through manipulation of the prism 10 as by rotation of the shroud or by tilting the camera, complete control and selection of the effects achieved may be realized.

It is pointed out that some of the novel effects which may be achieved with this invention are necessarily dependent to some extent on the objects photographed and the amount of light, and intensity of light, available. Thus, the "mirror reflex" phenomenon is not available unless both a high-intensity source of light (such as, bright sunlight), and a highly-reflective photographic object are available.

On the other hand, some of the novel and artistic effects may be achieved under any circumstances wherein an ordinary photograph could be made. It is extremely important to this invention, however, that the photographer is able to select the effect or effects desired for each particular photograph, and is able to maneuver the apparatus by rotating the prism 10 (and perhaps also by tilting the camera) in order to obtain the desired results. This is the feature which makes the present invention commercially practical, and is a feature that cannot be achieved with any of the prior art structures. And it is further important that the camera may at all times receive an image which is completely undistorted in size and shape.

It is also important that the present apparatus provides a means for obtaining the desired color and other effects and for being able to ascertain before the picture is made what the final result of those effects will be.

Although the invention has been described in terms of a single embodiment, it will be obvious to those skilled in the art that various changes may be made in the structures herein illustrated without departing from the scope of the invention, which is defined in the appended claims. For example, whereas in this embodiment the lens holder and shroud have been described as separate pieces, they could be constructed as an integral part with other means for rotating the prism.

What is claimed is:

1. Photographic apparatus suitable for use in obtaining novel and artistic effects comprising:
    a camera having a lens mounted in an extended lens holder;
    a generally tubular shroud suitable for fitting in the end of said lens holder, the longitudinal axis of said shroud being concentric with the longitudinal axis of said lens holder;
    a prism having at least first and second plane faces intersecting at an angle of substantially 90° disposed in said shroud, in a manner such that at least a semicircular section of said lens is not covered by any portion of said prism, and so that said first plane face is generally perpendicular to said longitudinal axes, and said second plane face is generally parallel to said longitudinal axes and wherein said longitudinal axes are in approximately the same plane with said second face;
    means for mounting said prism in said shroud; and
    means for rotating said prism through 360° with respect to said lens, in a manner such that the relative position of each point on said prism with respect to the center of said lens remains constant, whereby said camera is free to receive an undistorted object and at the same time selected artistic effects may be realized.

2. Photographic apparatus in accordance with claim 1, wherein said prism additionally includes a planar hypotenuse, through which light rays are emitted into said camera, generally parallel to said longitudinal axes, after entering said prism through said first face.

3. Photographic apparatus in accordance with claim 1, wherein said lens holder is cylindrical and is provided with threads opposite said camera, and said shroud is provided with threads for mating with the threads of said lens holder.

4. Photographic apparatus suitable for use in obtaining novel and artistic effects, comprising:
    a camera body;
    an elongated lens holder mounted in said body, and extending therefrom, said lens holder having a longitudinal axis extending therethrough;
    a lens mounted in said lens holder, the center of said lens being disposed on the longitudinal axis of said lens holder;
a prism mounted in said lens holder on the side of said lens opposite the camera body, said prism including:
a first face disposed generally parallel with said longitudinal axis, and
a second face disposed generally perpendicular with said longitudinal axis,
whereby substantially a semicircular part of said lens is left uncovered by said prism; and
means for rotating said prism with respect to said lens in such a manner that each point on said prism remains a constant distance from the center of said lens,
whereby said camera is free to receive an undistorted image and at the same time artistic effects may be realized.

5. Photographic apparatus in accordance with claim 4, wherein said means for rotating said prism are effective throughout a full 360°.

6. Photographic apparatus in accordance with claim 4, wherein said lens holder is constructed of two parts, the first part of which is stationary with respect to said camera body and contains said lens, and the second part of which is rotatable and contains said prism.

7. Photographic apparatus in accordance with claim 4, wherein said first and second faces of said prism are disposed at a right angle with respect to each other, and are connected by a planar hypotenuse through which rays are emitted after entering said prism through said first face.

8. Photographic apparatus suitable for use in obtaining novel and artistic effects, comprising:
a camera body having a front face;
an opening in said front face;
an elongated generally cylindrical lens holder fitting into said opening and fixedly mounted to said camera body, one end of said lens holder terminating in a threaded portion at a point removed from said camera body, said lens holder having a longitudinal axis extending through the middle thereof;
a lens mounted in said lens holder, the center of said lens being disposed on the longitudinal axis of said lens holder;
a generally tubular shroud threadedly connected to said lens holder at said threaded portion thereof, the longitudinal axis of said shroud being concentric with the longitudinal axis of said lens holder;
a prism mounted in said shroud, said prism including:
a first face disposed generally parallel with said longitudinal axis, and
a second face disposed generally perpendicular with said longitudinal axis,
whereby substantially a semicircular part of said lens is left uncovered by said prism;
means for mounting said prism in said shroud; and,
means for rotating said prism with respect to said lens in such a manner that each point on said prism remains a constant distance from the center of said lens,
whereby said camera is free to receive an undistorted image and at the same time artistic effects may be realized.

9. Photographic apparatus in accordance with claim 8, wherein said means for rotating said prism are effective throughout a full 360°.

10. Photographic apparatus in accordance with claim 8, wherein said first and second faces of said prism are disposed at a right angle with respect to each other, and are connected by a planar hypotenuse through which rays are emitted after entering said prism through said first face.

References Cited

UNITED STATES PATENTS 3,323,429   6/1967   Howard _____ 95—1

NORTON ANSHER, *Primary Examiner.*

R. M. SHEER, *Assistant Examiner.*